(12) United States Patent
Teshima et al.

(10) Patent No.: US 6,804,732 B2
(45) Date of Patent: Oct. 12, 2004

(54) PORT SAMPLING CIRCUIT APPARATUS INCORPORATED IN A MICROCOMPUTER

(75) Inventors: Yoshinori Teshima, Toyota (JP); Susumu Tsuruta, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/402,807

(22) Filed: Mar. 28, 2003

(65) Prior Publication Data

US 2003/0191886 A1 Oct. 9, 2003

(30) Foreign Application Priority Data

Mar. 29, 2002 (JP) ........................................ 2002-094373

(51) Int. Cl.[7] .............................. G06F 13/14; G06F 3/00
(52) U.S. Cl. ............................. 710/58; 710/33; 710/38; 710/5; 711/100; 713/300; 713/320; 713/322; 713/1; 713/324
(58) Field of Search ................................ 710/5, 33, 38, 710/58; 711/100; 713/1, 300, 320, 322, 324

(56) References Cited

U.S. PATENT DOCUMENTS 4,389,642 A * 6/1983 Kahn ........................ 340/2.2

FOREIGN PATENT DOCUMENTS

| JP | 56-11556 | | 2/1981 | | |
|---|---|---|---|---|---|
| JP | 56-38655 | | 4/1981 | | |
| JP | 362204304 A | * | 9/1987 | ........... | G05B/15/02 |
| JP | 64-66726 | | 3/1989 | | |
| JP | 402005141 A | * | 1/1990 | ............. | G06F/9/46 |
| JP | 3-142582 | | 6/1991 | | |
| JP | 5-314281 | | 11/1993 | | |
| JP | 2001-159947 | | 6/2001 | | |

* cited by examiner

Primary Examiner—Tammara Peyton
(74) Attorney, Agent, or Firm—Harness, Dickey & Pierce, PLC

(57) ABSTRACT

A signal output section of a port sampling circuit 6 periodically changes the output level of an output port 11 based on a sampling period stored in a register which is set by CPU 2. A data latch section of the port sampling circuit 6 latches the data given to an input port 10 based on a timing signal, with a starting point being set on a change point of the output level. A data register stores the latched data.

10 Claims, 8 Drawing Sheets

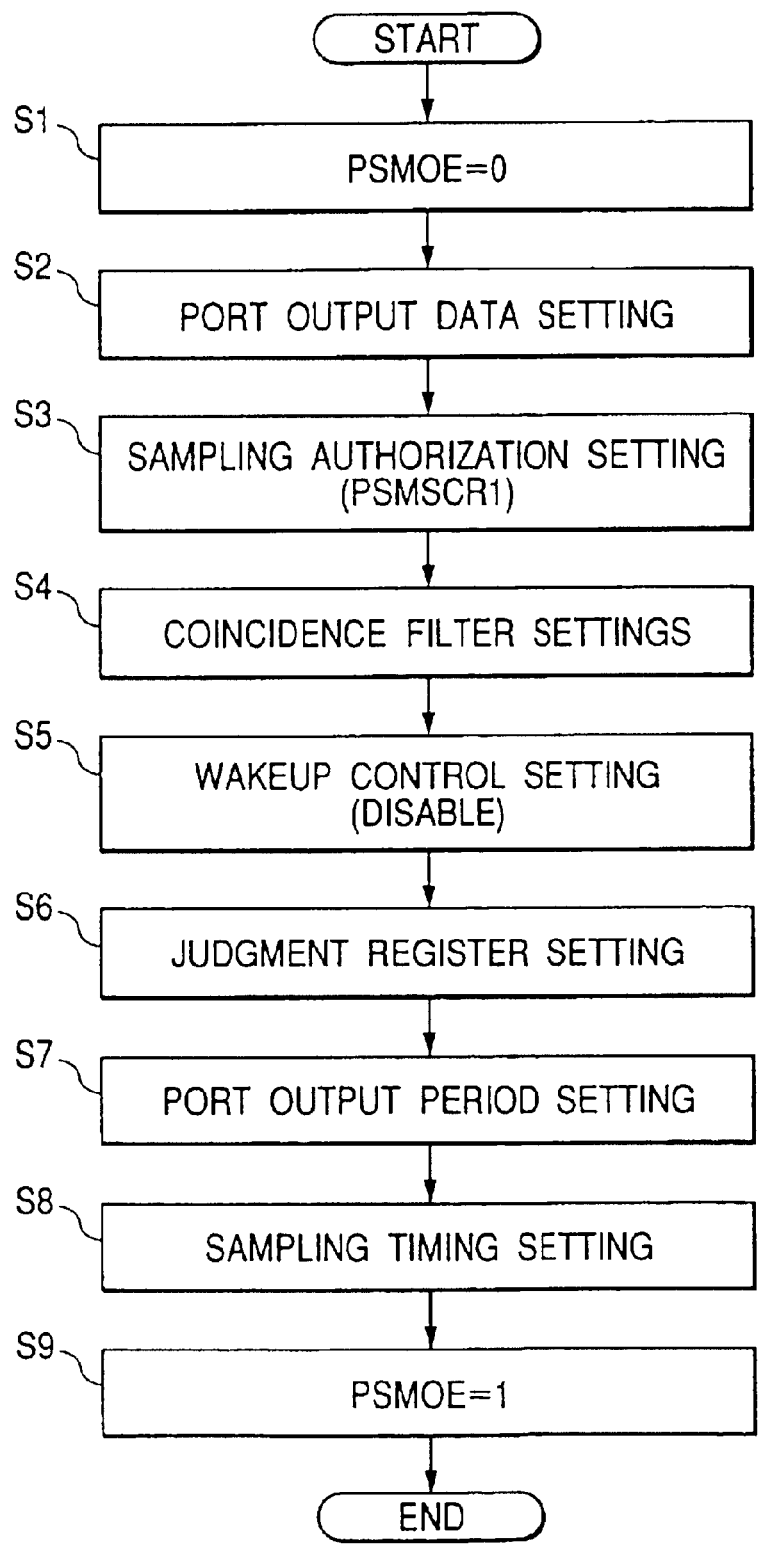

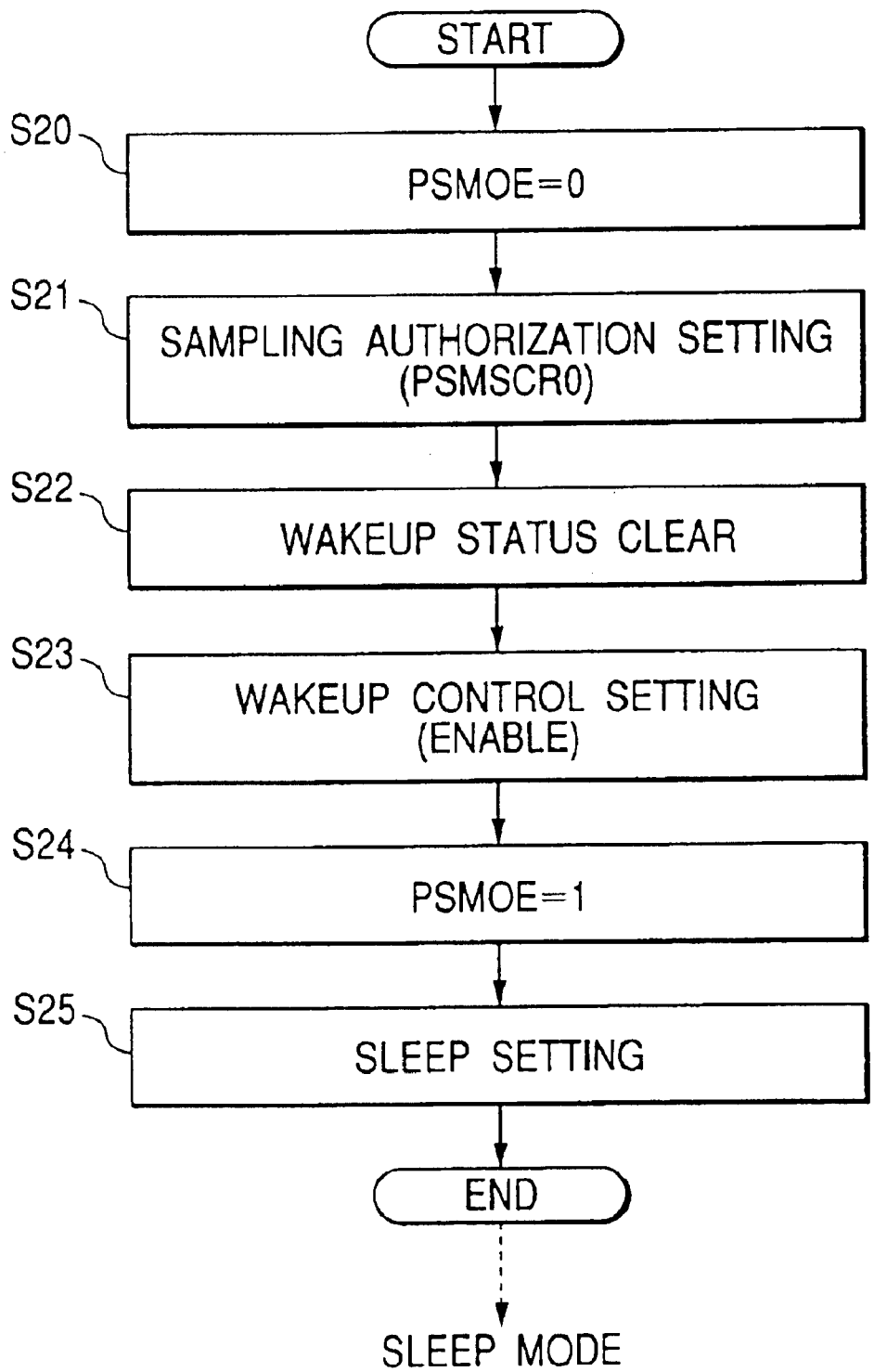

FIG. 8A (a) MICROCOMPUTER OPERATING CONDITION 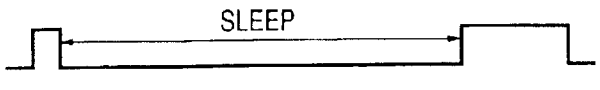

(b) CR 2 DE-MULTIPLED CLOCK 

(c) PORT OUTPUT CYCLE COUNTER (PSMCYCNT) 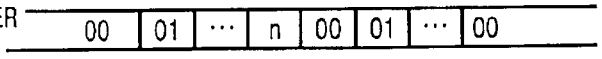

(d) PSMOUT (PSMODT=1) 

(e) TERMINAL WAVEFORM (PSMIN) 

(f) CR CLOCK 

(g) DATA REGISTER (PSMDAT) 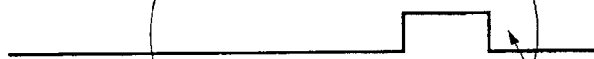

(h) SAMPLING WAKEUP STATUS REGISTER (PSMWSTR) 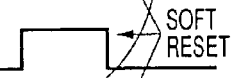

(i) WAKEUP FACTOR (WKUP) 

FIG. 8B (d) PSMOUT 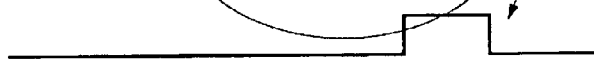

(f) CR CLOCK 

(j) SAMPLING TIMING COUNTER (PSMTMGCNT) 

(k) SAMPLING SIGNAL 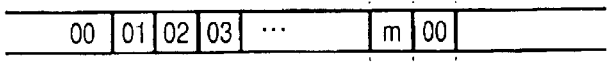

(g) DATA REGISTER (PSMDAT) 

(h) SAMPLING WAKEUP STATUS REGISTER (PSMWSTR) 

(i) WAKEUP FACTOR (WKUP) 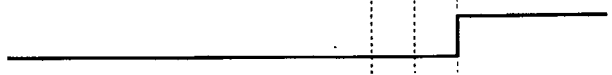

PORT SAMPLING CIRCUIT APPARATUS INCORPORATED IN A MICROCOMPUTER

BACKGROUND OF THE INVENTION

1. Field of the Invention

The present invention relates to a port sampling circuit apparatus performing sampling of input ports of a microcomputer based on conditions instructed by a central processing unit, and also relates to a microcomputer incorporating this port sampling circuit apparatus.

2. Description of the Background Art

A central processing unit (hereinafter referred to as CPU), constituting an essential part of a microcomputer, is often required to have the capability of sampling the level of a signal produced from an external device or the like, which is connected to an input terminal of the microcomputer, for the purpose of changing the control condition thereof. In such a case, a control program of the CPU needs to be described so as to realize this function. According to this control program, the CPU performs sampling of the input ports of the microcomputer at predetermined intervals (e.g., at intervals of several tens $\mu$ seconds to several hundreds $\mu$ seconds).

More specifically, the CPU performs a writing operation to output a timing signal for latching the data entered into the input port of the microcomputer. Then, the CPU performs a reading operation to read out the latched data. The CPU periodically repeats these write and read operations.

Hence, a definitely necessary process is for creating or producing the software for realizing the above-described sampling operation. Furthermore, in actual operations of the CPU, the control program needs to absorb the burden of such sampling operations. Accordingly, in the even that the CPU has many other tasks to be performed, it is difficult to shorten the sampling period sufficiently.

SUMMARY OF THE INVENTION

In view of the foregoing problem of the prior art, the present invention has an object to provide a port sampling circuit apparatus which is capable of reducing the burden of CPU even when the sampling operation is repetitively performed.

Furthermore, the present invention has an object to provide a microcomputer incorporating this port sampling circuit apparatus.

To accomplish the above and other related objects, the present invention provides a port sampling circuit apparatus including a hardware arrangement for automatically performing sampling of data given to an input port of a microcomputer based on conditions instructed by a central processing unit and for storing the sampled data into a data register whose stored data is readable by the central processing unit.

According to this arrangement, the CPU needs not to perform periodical sampling of input ports of the microcomputer. The required thing for the CPU is only reading out the data at appropriate timings when any data is given to its input ports of the microcomputer from the external devices.

Accordingly, there is no necessity of adding the programmatic description relating to the sampling processing into the control program of the CPU. The process of creating the program of the CPU can be simplified. Furthermore, the processing burden of the CPU in the actual operations can be also reduced.

Furthermore, according to a preferable embodiment of the present invention, the hardware arrangement of the port sampling circuit apparatus includes a sampling period setting register for setting a sampling period, a sampling timing signal output section for outputting a sampling timing signal periodically based on the sampling period being set by the sampling period setting register, and a data latch section for latching the data given to the input port of the microcomputer based on the sampling timing signal produced from the sampling timing signal output section and for storing the latched data into the data register.

According to this arrangement, the sampling period can be adequately changed when the CPU instructs the setting data to the sampling period setting register. The sampling timing signal output section periodically generates the sampling timing signal based on the sampling period being thus instructed by the CPU, and the data latch section latches the data given to the input port of the microcomputer based on the sampling timing signal and stores the latched data into the data register. Thus, the sampling period can be arbitrarily changed or adjusted according to practical specifications of individual applications.

Furthermore, according to the preferable embodiment of the present invention, the hardware arrangement of the port sampling circuit apparatus includes an output condition changing means for periodically changing a condition of an output port of the microcomputer in synchronism with timing of the sampling. For example, the hardware arrangement of the port sampling circuit apparatus includes an output condition changing means for periodically changing the condition of an output port of the microcomputer in synchronism with the sampling timing signal.

In some cases, in performing sampling of the input ports, it may be necessary to change the conditions of peripheral circuits of the microcomputer.

For example, depending on the type of external devices, or depending on the arrangement of peripheral circuits, outputting signals to the input ports is feasible only when the CPU is in an active condition.

Accordingly, in such a case, according to the above arrangement, the port sampling circuit arrangement automatically changes the condition of the output port and periodically drives the external device connected to the output port in synchronism with the sampling timing. Hence, the CPU needs not to perform the driving control of the external devices. The processing burden of the CPU can be further reduced.

Furthermore, according to the preferable embodiment of the present invention, the output condition changing means includes a condition change period setting register for setting a period for changing the condition of the output port, a condition change timing signal output section for periodically outputting a condition change timing signal based on the condition change period being set by the condition change period setting register, and a condition changing section for changing the condition of the output port based on the condition change timing signal produced from the condition change timing signal output section. According to this arrangement, the CPU can arbitrarily store the period for changing the condition of the output port to the condition change period setting register.

Furthermore, according to the preferable embodiment of the present invention, the condition change period setting register is also able to serve as the sampling period setting register. This is effective to perform both of settings by using only one register. The setting processing can be simplified.

Furthermore, according to the preferable embodiment of the present invention, the hardware arrangement of the port sampling circuit apparatus further includes a sampling start time setting register for setting a time required after the condition of the output port changes until the sampling of data given to the input port starts, and the sampling timing signal output section is constituted so as to periodically output the sampling timing signal based on the sampling period and also based on the sampling start time being set by the sampling start time setting register.

According to this arrangement, in the case that the condition of the output port is changed to drive the external device, it becomes possible to set optimum sampling timing for individual cases so that the data level of the data entered to the input port from the external device is sufficiently stabilized after starting the driving of this device.

Furthermore, according to the preferable embodiment of the present invention, the hardware arrangement of the port sampling circuit apparatus further includes an expected value set register into which an expected value of sampling data is set by the central processing unit, and a coincidence signal output section for outputting a coincidence signal to the outside when the data latched by the data latch section agrees with the expected value being set in the expected value set register.

Namely, when the expected value is set beforehand in the expected value set register, the port sampling circuit apparatus can cancel the power saving mode as soon as it samples the data identical with the expected value. Hence, the CPU needs not to perform the polling for the input ports at predetermined intervals to check whether or not the sampled data is equal to the expected value. Accordingly, the processing burden of CPU can be reduced effectively.

Another aspect of the present invention provides a microcomputer including a central processing unit and the above-described port sampling circuit apparatus. According to this arrangement, it becomes possible to leave all of the sampling processing to the port sampling circuit apparatus so as to increase the processing capability of the CPU for the remaining tasks.

According to the preferred embodiment of the present invention, the coincidence signal is supplied as an interrupt signal to the central processing unit. Thus, the CPU can immediately know the fact that the data identical with the expected value has been sampled.

Furthermore, according to the preferred embodiment of the present invention, the central processing unit has a function of executing a power saving mode for reducing electric power consumption according to which the central processing unit is brought into a low-power or less-activated condition. The coincidence signal is supplied to the central processing unit as a cancel signal for canceling the power saving mode.

For example, in the event that the CPU judges that there is no necessity of continuing ordinary operations, it is preferable to change the operating mode of the CPU into the power saving mode, for example, by stopping supply of the clock signal. In general, the CPU cannot perform the sampling of the input ports in the power saving mode. On the contrary, when the CPU needs to perform the sampling operation periodically, the CPU could not go into the power saving mode.

In view of the above, it is preferable that the CPU sets the expected value beforehand in the expected value set register. During the power saving mode of the CPU, the port sampling circuit apparatus continuously performs the sampling processing and cancels the power saving mode as soon as the data identical with the expected value is sampled.

Accordingly, the CPU can easily go into the power saving mode in the event that the next processing should start in response to the sampling of specific data. The required thing for the CPU is only waiting for the cancel signal (i.e., coincidence signal) which is issued by the port sampling circuit apparatus. Therefore, the CPU does not fail to catch the data incoming during the power saving mode and can respond to it or behave properly. In other words, the CPU can effectively utilize the power saving mode. Electric power consumption can be reduced satisfactorily.

BRIEF DESCRIPTION OF THE DRAWINGS

The above and other objects, features, aspects and advantages of the present invention will become more apparent from the following detailed description of the present invention which is to be read in conjunction with the accompanying drawings, in which:

FIG. 6 is a flowchart showing the procedure of register settings performed for the port sampling circuit in accordance with the preferred embodiment of the present invention, in the case that the CPU uses the port sampling circuit during its ordinary operations;

FIG. 7 is a flowchart showing the procedure of register settings performed for the port sampling circuit in accordance with the preferred embodiment of the present invention, in the case that the CPU transfers into a sleep mode;

FIG. 8A is a timing chart showing the operation of the port sampling circuit performed in the case that the CPU transfers into the sleep mode after accomplishing the processing shown in FIG. 7;

FIG. 8B is an enlarged timing chart showing an essential part of FIG. 8A; and

DESCRIPTION OF THE PREFERRED EMBODIMENT

Figure 1:
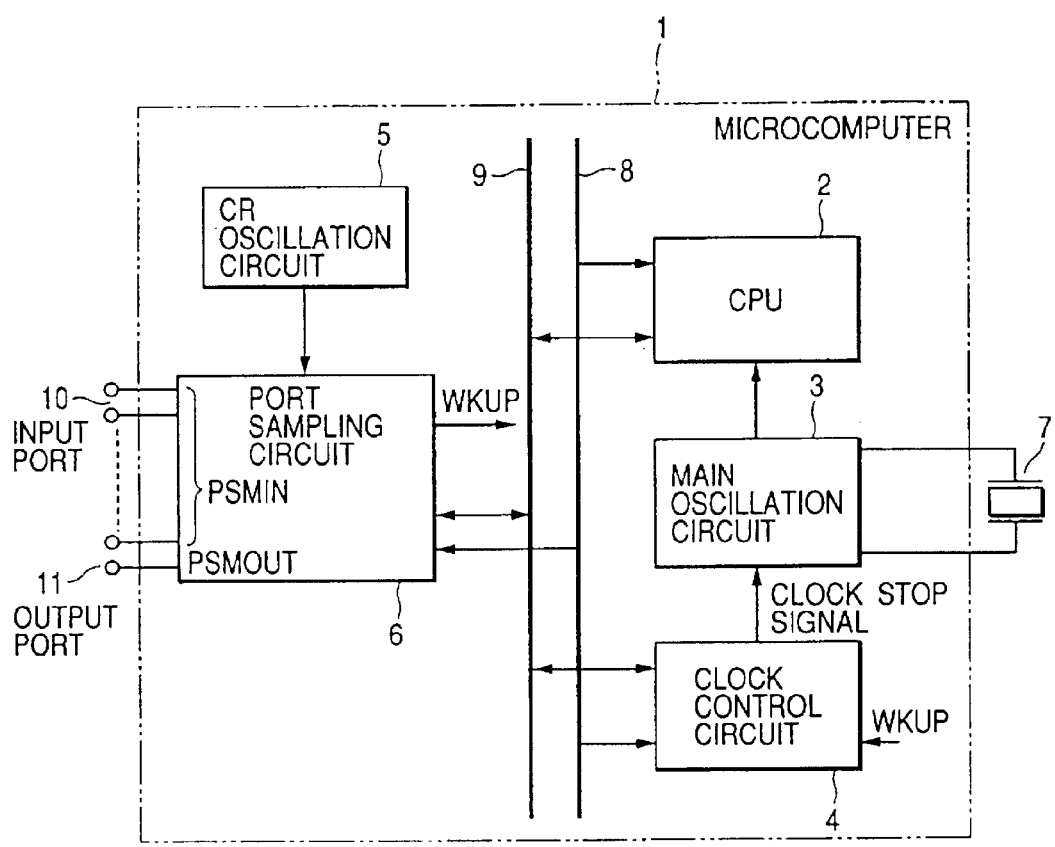
FIG. 1 is a block diagram showing a schematic circuit arrangement of a microcomputer in accordance with a preferred embodiment of the present invention, which is preferably incorporated in a body ECU (i.e., electronic control unit) of an automotive vehicle.

A preferred embodiment of the present invention will be explained with reference to attached drawings. FIG. 1 shows a circuit arrangement of a single chip microcomputer employable in a body ECU (i.e., electronic control unit) of an automotive vehicle. The microcomputer 1 includes a CPU 2 serving as main component and further includes peripheral components, such as a main oscillation circuit 3, a clock control circuit 4, a CR oscillation circuit 5, and a port sampling circuit 6.

The main oscillation circuit 3 oscillates a quartz resonator 7 connected to the microcomputer 1 and supplies a clock signal (e.g., a machine clock or a system clock) for operating the CPU 2. The clock control circuit 4 outputs a clock stop signal to the main oscillation circuit 3 in response to a sleep/stop mode start command sent from CPU 2 via an address bus 8 and a data bus 9. The main oscillation circuit 3 stops outputting the clock signal when it receives the clock stop signal from the clock control circuit 4, thereby bringing CPU 2 (or the microcomputer 1 including CPU 2) into a sleep/stop mode.

The sleep mode is automatically canceled when a predetermined time has counted by a timer incorporated in the clock control circuit 4. The stop mode is not canceled unless there is any wakeup factor, such as a later-described wakeup signal, happening outside. In both of the sleep mode and the stop mode, the operation of CPU 2 is brought into a low-power or less-activated condition so as to suppress electric power consumption in CPU 2.

The clock control circuit 4 stops outputting the clock stop signal when the port sampling circuit 6 outputs the wakeup signal in accordance with the later-described condition settings. In response to stop of the clock stop signal, the main oscillation circuit 3 resumes outputting the clock signal. Even if the CPU 2 is in the sleep mode, the wakeup signal cancels this mode.

For example, the oscillation frequency of the main oscillation circuit 3 is approximately 4 MHz. The oscillation frequency of the CR oscillation circuit 5 is approximately 25 MHz. Furthermore, CPU 2 operates at the clock frequency of 16 MHz by frequency multiplying a clock 1 of frequency 4 MHz in a PLL oscillation circuit (not shown).

The port sampling circuit 6 is a complete hardware device which automatically performs sampling of data or signals entered into numerous, e.g., thirty-two, input ports (PSMIN) 10 of the microcomputer 1 from external devices (not shown) in accordance with the settings applied to the internal registers from CPU 2. In this description, the "devices" are used as the conceptual technical terminology including transistors or comparable circuit elements.

Furthermore, the port sampling circuit 6 outputs a signal or data to an external device via an output port (PSMOUT) 11 of the microcomputer 1. For example, the port sampling circuit 6 can periodically drive external devices. Although not shown, the microcomputer 1 is equipped with other peripheral components including interrupt controller, DMA (i.e., direct memory access) controller, watchdog timer, A/D converters, D/A converters, and serial communication circuit.

Figure 2:
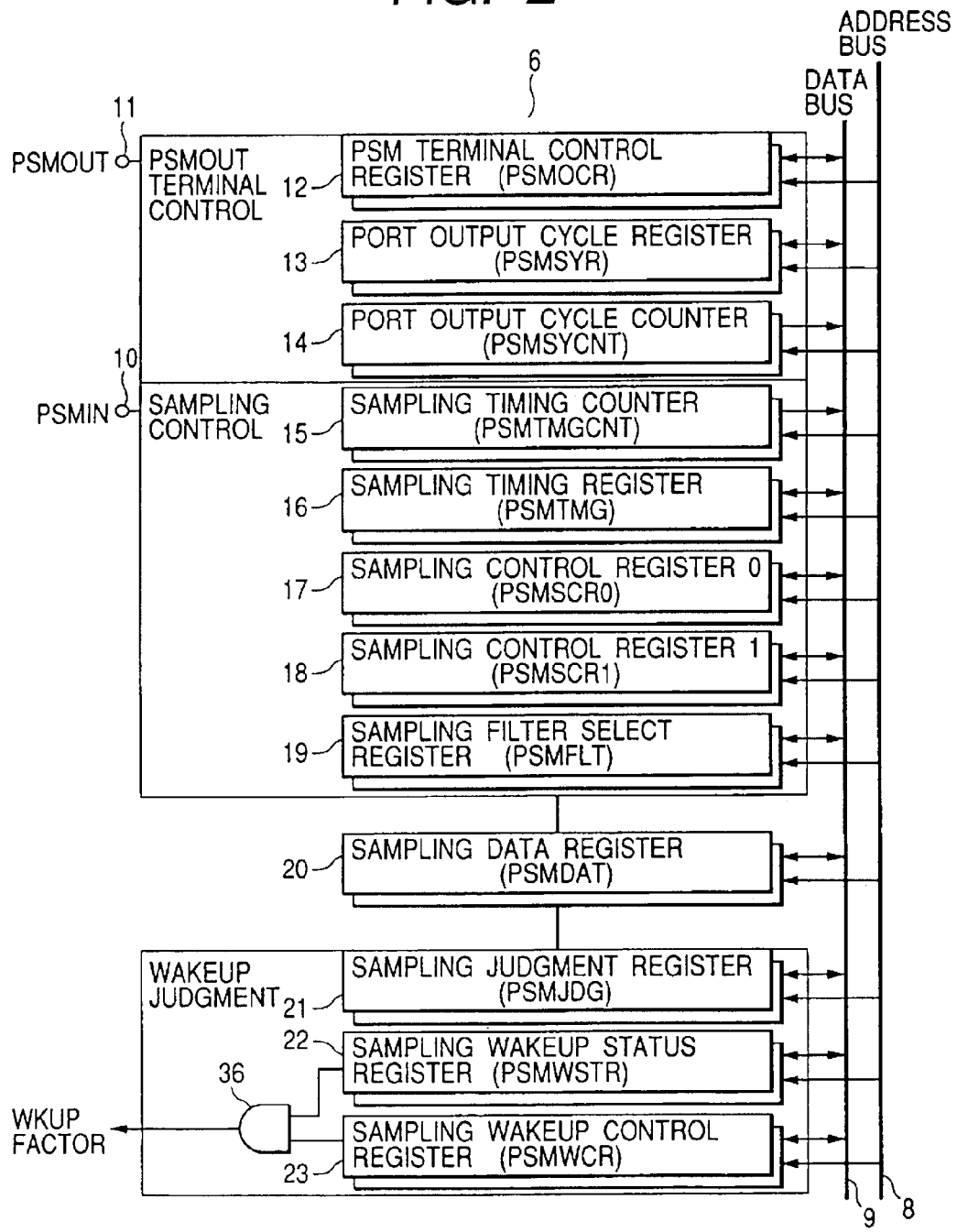
FIG. 2 is a block diagram showing registers and counters provided in a port sampling circuit in accordance with the preferred embodiment of the present invention.

FIG. 2 shows registers and counters incorporated in the port sampling circuit 6, in which a PSM terminal control register (PSMOCR) 12, a port output cycle register (PSMCYR) 13, and a port output cycle counter (PSMCYCNT) 14 are cooperative with each other to chiefly perform the settings for the output port 11. The port output cycle register 13 has the capability of serving as a sampling period setting register and also serving as a condition change period setting register.

Figure 3:
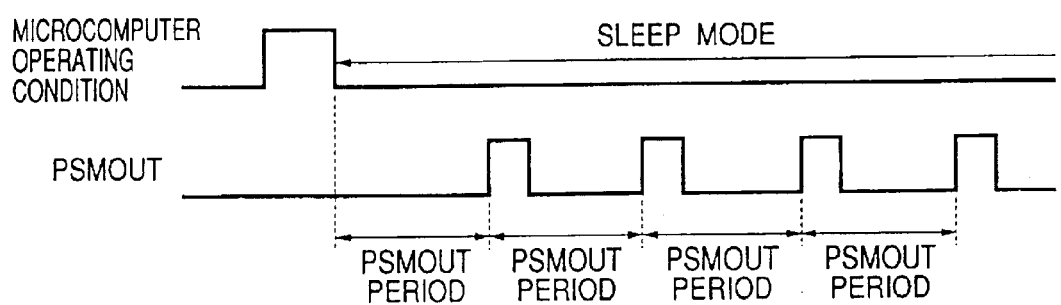
FIG. 3 is a timing chart showing the level change period of an output port of the microcomputer in accordance with the preferred embodiment of the present invention.

The register 12 is a register performing the settings relating to data output, enable control of sampling operation, and output data level (H, L). The register 13 is a register performing the settings relating to a period for driving the output port 11 to H or L level in the sleep mode as understood with reference to FIG. 3. The counter 14 is a counter counting the CR clock produced from the CR oscillation circuit 5 by using a frequency de-multiplied clock. When the count value of counter 14 agrees with a value stored in the register 13, a timing signal for driving the output port 11 is generated and the count 14 is cleared.

A sampling timing counter (PSMTMGCNT) 15, a sampling timing register (PSMTMG) 16, a sampling control register (PSMSCR0) 17, a sampling control register (PSMSCR1) 18, and a sampling filter select register (PSMFLT) 19 are cooperative with each other to chiefly perform the settings relating to sampling processing. The sampling timing register 16 is capable of serving as a sampling start time setting register.

Figure 4:
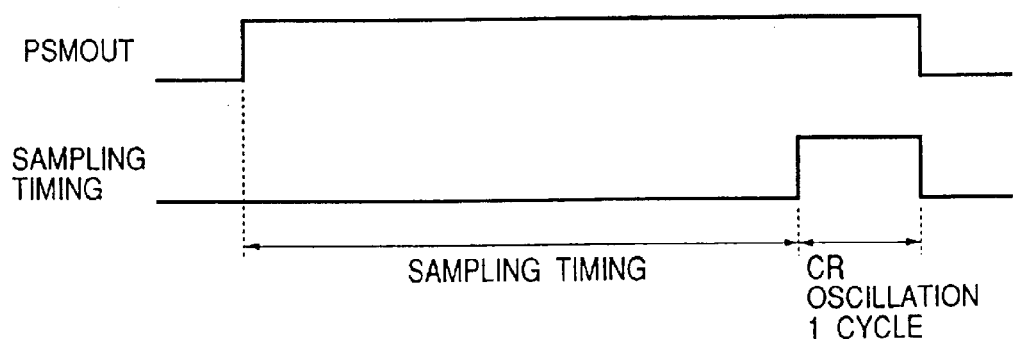
FIG. 4 is a timing chart showing the sample timing in accordance with the preferred embodiment of the present invention.

The counter 15 is a counter counting the CR clock produced from the CR oscillation circuit 5. The register 16 is a register performing the settings relating to a timing of sampling to be set after the drive of the output port 11 starts (refer to FIG. 4). When the count value of counter 15 agrees with a value stored in the register 16, a timing signal for performing the sampling is generated and the count 15 is cleared.

The registers 17 and 18 are registers performing the enable control for the sampling processing. The register 17 performs the settings relating to a power saving mode wherein the CPU 2 is brought into the sleep mode or the stop mode, while the register 18 performs the settings relating to a wakeup mode wherein the CPU 2 operates ordinarily The register 19 is a register performing the settings relating to judgment as to whether or not a later-described twice-coincidence filter 33 should be selected (i.e., should be validated). In the case the twice-coincidence filter 33 is selected, a sampling data register 20 stores the sampling data when the present sampling data agrees with the previous sampling data.

A sampling judgment register (PSMJDG) 21, a sampling wakeup status register (PSMWSTR) 22, and a sampling wakeup control register (PSMWCR) 23 are cooperative with each other to chiefly perform the settings relating to output control of a wakeup signal WKUP.

The register 21, which is capable of serving as an expected value set register, is a register performing the settings relating to an expected value of sampling data according to the instruction from CPU 2. A wakeup factor arises when the setting value of the register 21 agrees with the data value stored in the data register 20. The register 22 is a register storing a comparison result between the register 21 and the data register 20. The register 23 is a register performing the settings relating to judgment as to whether or not generation of the wakeup signal WKUP should be allowed based on the above-described wakeup factor.

Figure 5:
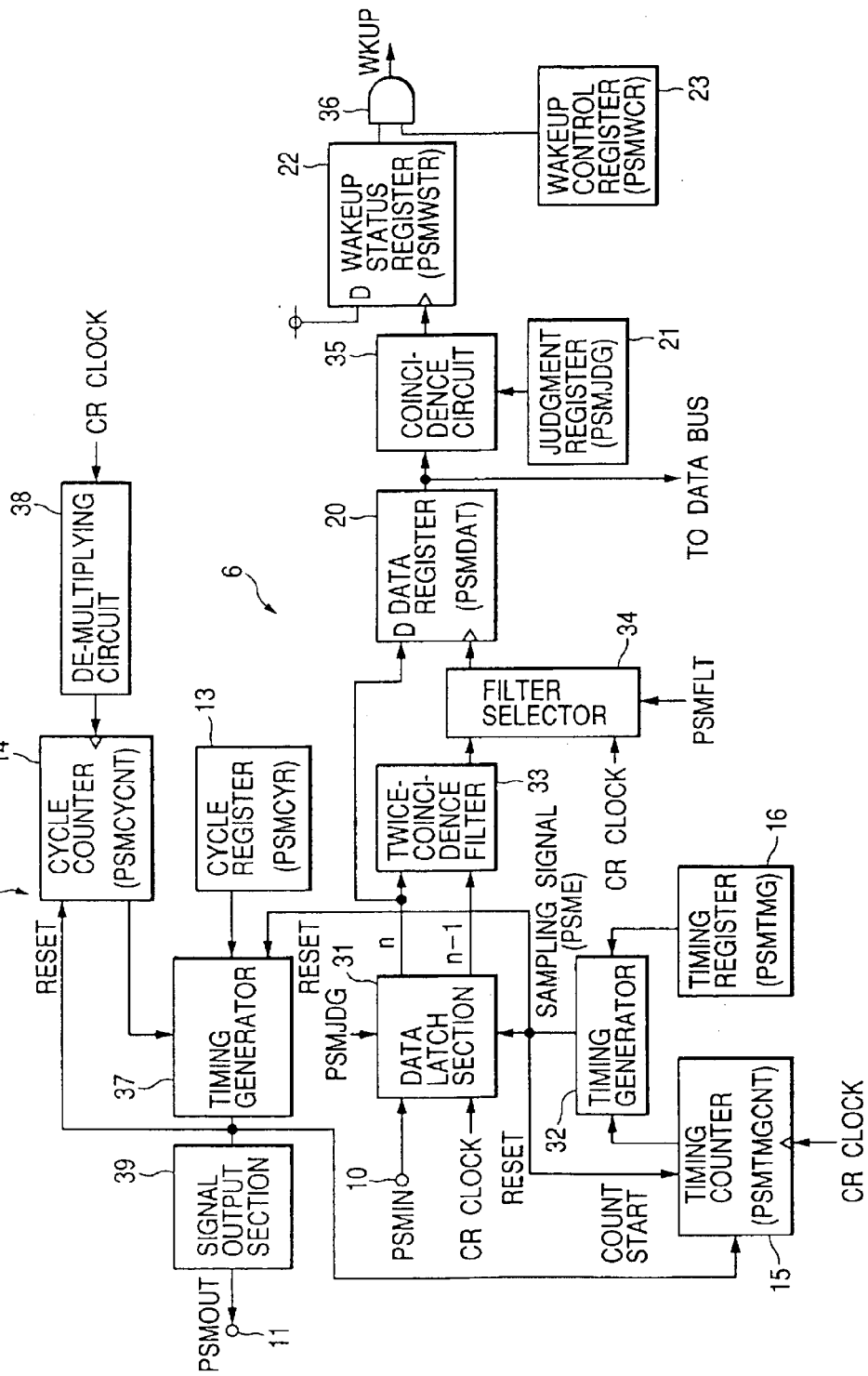
FIG. 5 is a functional block diagram schematically showing an internal arrangement of the port sampling circuit in accordance with the preferred embodiment of the present invention.

FIG. 5 is a functional block diagram schematically showing the internal arrangement of the port sampling circuit 6. The input port (PSMIN) 10 is connected to an input terminal of a data latch section 31. The latch timing of the data latch section 31 is produced by a timing counter 15, a timing register 16, and a timing generator 32. More specifically, the timing generator 32 produces a sampling signal to the data latch section 31 when the count value of counter 15 agrees with the data value of register 16. In this respect, the timing generator 32 serves as a sampling timing signal output section.

Although the internal arrangement of the data latch section 31 is not shown in the drawing, two data latch circuits are serially connected to hold a present sampling data (n) and a previous sampling data (n−1). Both of these sampling data are sent to the twice-coincidence filter 33.

The twice-coincidence filter 33 produces a data '1' to a filter selector 34 when the present sampling data (n) agrees with the previous sampling data (n−1). The filter selector 34 controls generation of a latch signal to be supplied to the data register 20 disposed in the next stage. According to the settings of the register 19, the filter selector 34 sets either a filter selection or a filter non-selection. When the filter section is set, the CR clock is given to the data register 20 when the twice-coincidence filter 33 produces the data '1'. When the filter non-selection is set, the CR clock is given to the data register 20 irrespective of output condition of the twice-coincidence filter 33.

The present sampling data (n), produced from the data latch section 31, is given to an input terminal of the data register 20. The data latched in the data register 20 is sent to a coincidence circuit 35 disposed in the next stage and is also sent to the data bus 9 in response to reading operation of CPU 2.

The coincidence circuit 35, serving as a coincidence signal output section, sends a latch signal to the wakeup status register 22 when the data latched in the data register 20 agrees with a set value in the judgment register 21. The wakeup factor '1' is set in the register 22. An output data of the register 22 is given to one input terminal of an AND gate 36.

The setting data of the wakeup control register 23 is given to the other input terminal of the AND gate 36. The AND gate 36 sends the wakeup signal WKUP (i.e., coincidence signal having H level) to the clock control circuit 4 when the output data of the register 22 and the setting data of the register 23 are both 1.

The above-described arrangement is equally provided for each of thirty-two input ports 10 (i.e., for all of 32 bits).

On the other hand, a timing generator (i.e., a condition change timing signal output section) 37 sends a drive signal to the output port (PSMOUT) 11. The timing generator 37 sends a timing signal to a signal output section (i.e., a condition changing section) 39 when the count value counted by a frequency de-multiplied clock agrees with the value of the register 13. In this case, a de-multiplying circuit 38 divides the CR clock produced from the CR oscillation circuit 5 to obtain the de-multiplied clock having a frequency de-multiplied ratio of 2.

The signal output section 39 sends a drive signal to the output port 11 in accordance with the timing signal sent from the timing generator 37. Furthermore, the counter 14 is reset in response to the output of this timing signal. On the other hand, the counter 15 starts counting operation in response to this timing signal. The register 13, the counter 14, and the timing generator 37 are cooperative with each other to constitute an output condition changing means 40.

Next, the function of this embodiment will be explained with reference to FIGS. 6 to 8. FIG. 6 is a flowchart showing the procedure of register settings performed for the port sampling circuit 6 in the case that CPU 2 uses the port sampling circuit 6 during its ordinary operations (i.e., in the wakeup mode). First of all, in step SI, CPU 2 writes '0'into a bit corresponding to the PSM terminal control register 12 to set PSMO=0, thereby disabling the port output and the sampling processing.

Next, in step S2, CPU 22 performs the data level settings for the output port. The data level settings are performed in the following manner. When '1' is written into a bit corresponding to the register 12, the data level of the output port is set to L (default value). The data level is turned into H level during the output term of the drive signal. It is needless to say that the procedure of steps S1 and S2 is simultaneously feasible as the settings for the register 12.

Next, in step S3, CPU 2 performs the sampling authorization settings. According to the sampling authorization settings, CPU 2 writes '1' into a bit corresponding to the control register 18 to permit the sampling of each bit of 32 bits. Next, in step S4, CPU 2 performs the coincidence filter settings for determining whether or not the twice-coincidence filter 33 should be selected. According to the coincidence filter settings, CPU 2 writes '1' into a bit corresponding to the register 19 to select the twice-coincidence filter 33 for each bit of 32 bits.

Next, in step S5, CPU 2 performs the wakeup control settings. According to the wakeup control settings, CPU 2 writes '0' into all of the bits of the wakeup control register 23 to prohibit (i.e., disable) output of the wakeup signal WKUP.

Next, in step S6, CPU 2 performs the judgment register settings. According to the judgment register settings, CPU 2 writes an expected value of sampling data into the judgment register 21. This judgment register settings need to be done before CPU 2 goes into the sleep mode. More specifically, as long as CPU 2 operates ordinarily, CPU 2 performs polling for the data register 20. There is no necessity for the port sampling circuit 6 to perform the judgment for the sampling data.

Next, in step S7, CPU 2 performs the settings of port output period. According to the port output period settings, CPU 2 sets the data corresponding to a period for outputting a drive signal from the output port 11 and sends the set data to the port output cycle register 13. Next, in step S8, CPU 2 performs the settings of sampling timing. As described above, the CPU 2 sets the data corresponding to a time required until the sampling of input data is performed after output of the driving signal starts.

Finally, in step S9, CPU 2 writes '1' into the bit corresponding to the PSM terminal control register 12 to set PSMOE=1, thereby enabling the port output and the sampling processing. The setting processing ends.

After accomplishing the above-described settings for the internal registers, the port sampling circuit 6 sends the drive signal to the output port 11 in synchronism with the port output period so as to drive the external devices. Then, the port sampling circuit 6 repeats the sampling of data entered into the input ports 10 once the sampling term has passed since start of the driving operation. CPU 2 accesses the data register 20 of the port sampling circuit 6 at required timings to read out the stored data.

FIG. 7 is a flowchart showing the procedure of register settings performed for the port sampling circuit 6 in the case that CPU 2 transfers into the sleep mode. First of all, in step S20, CPU 2 writes '0' into the bit corresponding to the PSM terminal control register 12 to set PSMO=0, thereby disabling the port output and the sampling processing. Next, in step S21, CPU 2 writes '1' into a bit corresponding to the control register 17 to permit the sampling of each bit of 32 bits.

Next, in step S22, CPU write '0' into all of the bits of the wakeup status register 22 to clear the data. Then, in step S23, CPU 2 performs the wakeup control settings. According to the wakeup control settings, CPU 2 writes '1' into the bit corresponding to the wakeup control register 23 to authorize (i.e., enable) output of the wakeup signal WKUP.

Then, in step 24, CPU 2 writes '1' into the bit corresponding to the PSM terminal control register 12 to set PSMOE=1, thereby enabling the port output and the sampling processing. Then, in step S25, CPU 2 performs the settings for the sleep mode. According to the sleep mode settings, CPU 2 causes the clock control circuit 4 to stop the oscillating operation of the main oscillation circuit 3. No clock signal is supplied to CPU 2. Hence, CPU 2 transfers into the sleep mode.

FIG. 8A is a timing chart showing the operation of the port sampling circuit 6 performed in the case that CPU 2 transfers into the sleep mode after accomplishing the processing shown in FIG. 7. In this case, it is assumed that the twice-coincidence filter 33 is not selected.

In the timing chart of FIG. 8A, when CPU 2 transfers into the sleep mode (refer to waveform (a)), the counter 14 starts counting by using a de-multiplied clock having a frequency de-multiplied ratio of 2 with respect to the CR clock (refer to waveform (b) and count value (c)). Then, CPU 2 drives the level of the output port 11 from L to H when the count value of counter 14 agrees with a set value 'n' of the register 13 (refer to waveform (d)).

Then, in response to this level change of output port 11, it is now assumed that an external device inputs a high-level data into the input port 10 (refer to waveform (e)). The entered high-level data is sampled immediately before the level of the output port 11 returns from H to L. The output level of the data register 20 is changed from L to H (refer to waveform (g)). When this output level 'H' agrees with the set value of the bit corresponding to the judgment register 21, the value of a bit corresponding to the wakeup status register 22 becomes H. When any bit of the status register 22 becomes H, the wakeup signal WKUP of H level is produced.

When the wakeup signal WKUP is produced from the port sampling circuit 6, the clock control circuit 4 cancels the sleep mode and the main oscillation circuit 3 restarts the oscillating operation. CPU 2 again receives the clock signal and resumes its operations ordinarily. The data stored in the data register 20 and the bit values set in the status register 22 are later reset by CPU 2 in software.

FIG. 8B is an enlarged timing chart showing an essential part of FIG. 8A. As understood from the waveform (d), the timing counter 15 starts counting operation by using the CR clock when the level of the output port 11 shifts to H. When the count value of the timing counter 15 agrees with a set value 'm' of the timing register 16, the timing generator 32 produces the sampling signal (PSME) as a high-level signal having a pulse width equivalent to one CR clock. In response to this sampling signal, the data latch section 31 performs sampling of data entered into the input port 10.

Thereafter, a coincidence judgment between the latched data and the set value of the judgment register 21 is performed during one CR clock. Subsequently, at the next clock timing, the output condition of the data register 20 changes.

Namely, according to a conventional microcomputer, it was impossible to perform the sampling of the input ports once the microcomputer goes into the sleep mode or goes into a comparable power saving mode. In other words, the conventional microcomputer could not select the sleep mode when the sampling operation needs to be continuously performed.

On the contrary, according to the arrangement of this embodiment, the port sampling circuit 6 automatically and continuously performs the sampling operation even if CPU 2 goes into the sleep mode. Hence, in the event that any data triggering the next processing is entered, the sleep mode of CPU 2 is canceled as soon as the port sampling circuit 6 detects such entry of data. Accordingly, CPU 2 does not fail to catch any data entering during the sleep mode and can respond to it or behave appropriately.

Figure 9:
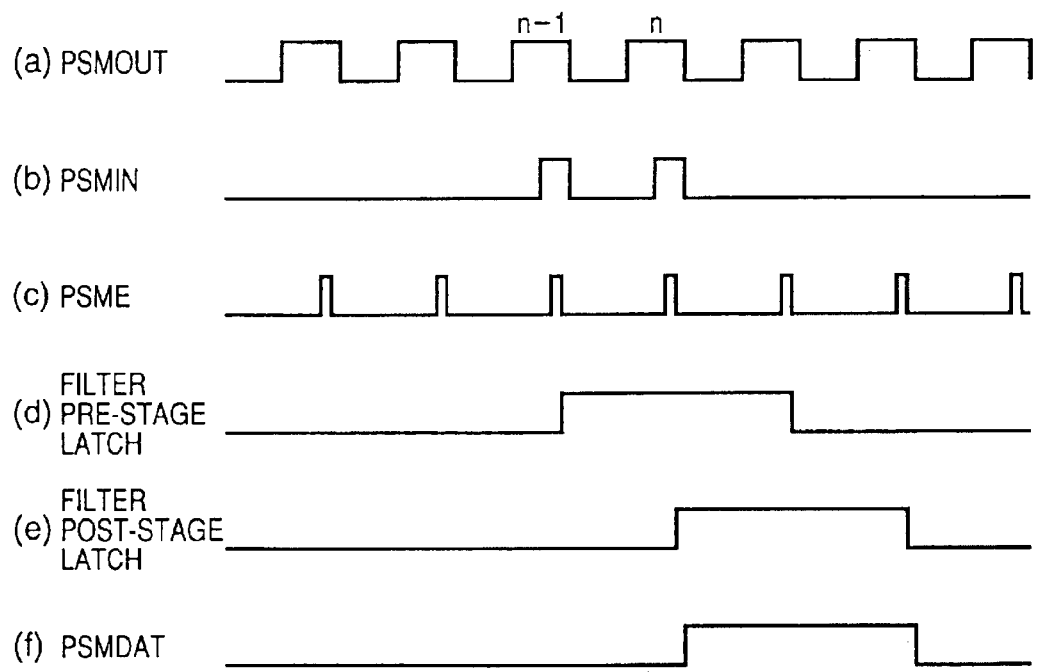
FIG. 9 is a timing chart showing an example of signals observed when a twice-coincidence filter is selected.

FIG. 9 is a timing chart showing an example of signals observed when the twice-coincidence filter 33 is selected. More specifically, the level of the input port 10 changes from L to H at the timing 'n−1' (refer to waveform (b)), and its level change is latched in the pre-stage latch of the data latch section 31 (refer to waveform (d)).

In the next timing 'n', the data latched at the pre-stage latch is forwarded to the post-stage latch (refer to waveform (e)). Then, the level of the input port 10 changes from L to H at the timing 'n' (refer to waveform (b)), and its level change is latched in the pre-stage latch of the data latch section 31 (refer to waveform (d)). As a result, the present sampling data agrees with the previous sampling data at the timing 'n'. The twice-coincidence filter 33 permits the data register 20 to output the latch signal. The data register 20 latches the data given to the input port 10.

In this manner, when the twice-coincidence filter 33 is selected, the data value is stored in the data register 20 only when the same data is successively sampled at two consecutive sampling timings. This makes it possible to eliminate erroneous sampling of data when the data level of the input port 10 temporarily changes in response to entry of an external noise. Accordingly, it becomes possible to surely prevent the microcomputer 1 from being adversely influenced by such external noises.

As described above, according to the above-described embodiment, the port sampling circuit 6 has a hardware arrangement capable of automatically performing sampling of the input ports 10 of the microcomputer 1 based on the conditions instructed by CPU 2. More specifically, the timing generator 32 periodically generates the sampling timing signal based on the sampling period stored in the register 13 and the sampling time stored in the register 16. The data latch section 31 latches the data given to the input port 10 based on this timing signal. The data register 20 stores the latched data.

Namely, CPU 2 needs not to perform periodical sampling of the input ports 10. The required thing for CPU 2 is only reading out the data at appropriate timings when any data is given to the input ports 10 from the external devices. Accordingly, there is no necessity of adding the programmatic description relating to the sampling processing into the control program of CPU 2. The process of creating the program of CPU 2 can be simplified. The processing burden of CPU 2 in the actual operations can be also reduced.

Furthermore, the output condition changing means 40 periodically changes the data level of the output port 11 in synchronism with the sampling timing of the input port 10, so as to periodically drive an external device connected to the input port 10. More specifically, the timing generator 37 periodically generates the drive timing signal based on the drive period stored in the register 13. The signal output section 39 changes the data level of the output port 11 based on the drive timing signal. Therefore, CPU 2 needs not to perform the driving control of external devices to perform the sampling of the input ports 10. The processing burden of CPU 2 can be further reduced.

Furthermore, as described above, the timing generator 32 periodically generates the sampling timing signal based on the sampling period stored in the register 13 and the sampling time stored in the register 16. Thus, it becomes possible to arbitrarily change or adjust the sampling timing according to individual cases so that the data level of the data entered to the input port 10 from each external device is sufficiently stabilized after starting the driving of this device.

Furthermore, in the case that CPU 2 is in the sleep mode, the coincidence circuit 35 of the port sampling circuit 6 sends the wakeup signal WKUP to the clock control circuit 4 via the AND gate 36 when the sampling data of the input port 10 agrees with the data stored in the judgment register 21.

Namely, when the expected value is set beforehand in the judgment register 21, the port sampling circuit 6 can cancel the sleep mode as soon as it samples the data identical with the expected value. Hence, CPU 2 does not fail to catch the data incoming during the sleep mode and can respond to it or behave properly. In other words, CPU 2 can effectively utilize the sleep mode. Electric power consumption can be reduced satisfactorily.

As the port sampling circuit 6 and CPU 2 are combined to constitute the microcomputer 1, CPU 2 can leave all of the sampling processing to the port sampling circuit 6 so as to increase the processing capability for the remaining tasks.

The present invention is not limited to the above-described and disclosed embodiment and therefore can be modified in various ways.

For example, it is possible to separately provide the sampling period setting register and the condition change period setting register.

Furthermore, the output condition changing means can be omitted if not necessary or can be simplified so as to only perform periodical sampling of the input port. In this case, the timing signal produced from the timing generator 37 can be used as a latch signal for the data latch section 31. Furthermore, the timing signal produced from the timing generator 37 can be used to reset and start the counter 15. In this case, the register 16 serves as sampling period setting register.

The change period of output condition or the sampling period can be fixed to predetermined values beforehand. Alternatively, the change period of output condition can be set as a variable value. Instead, it is possible to fix the duration from the beginning of the change to the timing of sampling.

The setting process for the judgment register 21 can be added to the sleep mode transfer procedure shown in FIG. 7.

During the ordinary operations of CPU 2, it is possible to send a coincidence signal as an interrupt signal to CPU 2 when the sampling data of the input port 10 agrees with the data stored in the judgment register 21. According to this arrangement, the interrupt signal lets CPU 2 know the fact that the data identical with the expected value has been sampled. Hence, CPU 2 needs not to perform the polling for the input port 10 at predetermined intervals to check whether or not the sampled data is equal to the expected value. Accordingly, the processing burden of CPU 2 can be reduced effectively.

It is also possible to integrate the timing generator 37 with the signal output section 39.

Furthermore, the function of executing the power saving mode, i.e., the function performed by the clock control circuit 4, can be performed by CPU 2.

Moreover, the power saving mode is generally set for reducing the electric power consumption in CPU 2 and is therefore not limited to the sleep/stop mode only. For example, the power saving mode will be realized by temporarily lowering the clock frequency or by stopping or restricting in part the function of the microcomputer.

Furthermore, it is not definitely necessary that CPU 2 or the microcomputer 1 has the capability of executing the power saving mode.

The twice-coincidence filter 33 can be omitted if not necessary. In this case, it is possible to remove the data latch section 31 and make the data register 20 directly latch the data given to the input port 10.

The present invention is not limited to an ECU installed in an automotive vehicle, and is therefore applicable to a wide variety of microcomputers which perform the sampling of input port.

While the invention has been shown and described in detail, the foregoing description is in all aspects illustrative and not restrictive. It is therefore understood that numerous other modifications and variations can be devised without departing from the scope of the invention.

What is claimed is:

1. A port sampling circuit apparatus comprising a hardware arrangement for automatically performing sampling of data given to an input port of a microcomputer based on conditions instructed by a central processing unit and for storing the sampled data into a data register whose stored data is readable by said central processing unit, wherein said hardware arrangement of the port sampling circuit apparatus comprises:
a sampling period setting register for setting a sampling period;
a sampling timing signal output section for outputting a sampling timing signal periodically based on said sampling period being set by said sampling period setting register;
a data latch section for latching the data given to said input port based on said sampling timing signal produced from said sampling timing signal output section, and for storing the latched data into said data register; and
an output condition changing means for periodically changing a condition of an output port of said microcomputer in synchronism with said sampling timing signal,
said output condition changing means comprises:
a condition change period setting register for setting a period for changing the condition of said output port;
a condition change timing signal output section for periodically outputting a condition change timing signal based on the condition chance period being set by said condition change period setting register; and
a condition changing section for changing the condition of said output port based on the condition chance timing signal produced from said condition change timing signal output section.

2. The port sampling circuit apparatus in accordance with claim 1, wherein said condition change period setting register is constituted so as to also serve as said sampling period setting register.

3. The port sampling circuit apparatus in accordance with claim 2, wherein said hardware arrangement of the port sampling circuit apparatus further comprises a sampling start time setting register for setting a time required after the condition of said output port changes until the sampling of data given to said input port starts, and said sampling timing signal output section is constituted so as to periodically output the sampling timing signal based on said sampling period and also based on the sampling start time being set by said sampling start time setting register.

4. A port sampling circuit apparatus comprising a hardware arrangement for automatically performing sampling of data given to an input port of a microcomputer based on conditions instructed by a central processing unit and for storing the sampled data into a data register whose stored data is readable by said central processing unit, wherein said hardware arrangement of the port sampling circuit apparatus comprises:
- a sampling period setting register for setting a sampling period;
- a sampling timing signal output section for outputting a sampling timing signal periodically based on said sampling period being set by said sampling period setting register;
- a data latch section for latching the data given to said input port based on said sampling timing signal produced from said sampling timing signal output section, and for storing the latched data into said data register;
- an expected value set register into which an expected value of sampling data is set by said central processing unit; and
- a coincidence signal output section for outputting a coincidence signal to the outside when the data latched by said data latch section agrees with said expected value being set in said expected value set register.

5. A microcomputer comprising:

a central processing unit; and a port sampling circuit apparatus comprising a hardware arrangement for automatically performing sampling of data given to an input port of a microcomputer based on conditions instructed by a central processing unit and for storing the sampled data into a data register whose stored data is readable by said central processing unit;

wherein said hardware arrangement of the port sampling circuit apparatus comprises:
- a sampling period setting register for setting a sampling period;
- a sampling timing signal output section for outputting a sampling timing signal periodically based on said sampling period being set by said sampling period setting register;
- a data latch section for latching the data given to said input port based on said sampling timing signal produced from said sampling timing signal output section, and for storing the latched data into said data register; and
- an output condition changing means for periodically changing a condition of an output port of said microcomputer in synchronism with said sampling timing signal, said output condition changing means comprises:
- a condition change period setting register for setting a period for changing the condition of said output port;
- a condition change timing signal output section for periodically outputting a condition change timing signal based on the condition change period being set by said condition change period setting register; and
- a condition changing section for changing the condition of said output port based on the condition change timing signal produced from said condition change timing signal output section.

6. The microcomputer in accordance with claim 5, wherein said condition change period setting register is constituted so as to also serve as said sampling period setting register.

7. The microcomputer in accordance with claim 6, wherein said hardware arrangement of the port sampling circuit apparatus further comprises a sampling start time setting register for setting a time required after the condition of said output port changes until the sampling of data given to said input port starts, and said sampling timing signal output section is constituted so as to periodically output the sampling timing signal based on said sampling period and also based on the sampling start time being set by said sampling start time setting register.

8. A microcomputer comprising:

a central processing unit; and a port sampling circuit apparatus comprising a hardware arrangement for automatically performing sampling of data given to an input port of a microcomputer based on conditions instructed by a central processing unit and for storing the sampled data into a data register whose stored data is readable by said central processing unit, wherein said hardware arrangement of the port sampling circuit apparatus comprises:
- a sampling period setting register for setting a sampling period;
- a sampling timing signal output section for outputting a sampling timing signal periodically based on said sampling period being set by said sampling period setting register;
- a data latch section for latching the data given to said input port based on said sampling timing signal produced from said sampling timing signal output section, and for storing the latched data into said data register;
- an expected value set register into which an expected value of sampling data is set by said central processing unit; and
- a coincidence signal output section for outputting a coincidence signal to the outside when the data latched by said data latch section agrees with said expected value being set in said expected value set register.

9. The microcomputer in accordance with claim 8, wherein said coincidence signal is supplied as an interrupt signal to said central processing unit.

10. The microcomputer in accordance with claim 8, wherein said central processing unit has a function of executing a power saving mode for reducing electric power consumption according to which said central processing unit is brought into a low-power or less-activated condition, and said coincidence signal is supplied to said central processing unit as a cancel signal for canceling said power saving mode.

* * * * *

UNITED STATES PATENT AND TRADEMARK OFFICE
CERTIFICATE OF CORRECTION

PATENT NO.   : 6,804,732 B2
DATED        : October 12, 2004
INVENTOR(S)  : Yoshinori Teshima et al.

It is certified that error appears in the above-identified patent and that said Letters Patent is hereby corrected as shown below:

Column 12,
Line 52, "chance" should read -- change --

Signed and Sealed this

Nineteenth Day of April, 2005

JON W. DUDAS
*Director of the United States Patent and Trademark Office*